US009803568B2

(12) United States Patent
Ochi et al.

(10) Patent No.: US 9,803,568 B2
(45) Date of Patent: Oct. 31, 2017

(54) CONTROL SYSTEM OF INTERNAL COMBUSTION ENGINE (AS AMENDED)

(71) Applicants: Yuta Ochi, Susono (JP); Toshimi Kashiwagura, Susono (JP); Akio Yoshimatsu, Gotenba (JP)

(72) Inventors: Yuta Ochi, Susono (JP); Toshimi Kashiwagura, Susono (JP); Akio Yoshimatsu, Gotenba (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 13 days.

(21) Appl. No.: 14/893,613

(22) PCT Filed: May 31, 2013

(86) PCT No.: PCT/JP2013/065242
§ 371 (c)(1),
(2) Date: Nov. 24, 2015

(87) PCT Pub. No.: WO2014/192147
PCT Pub. Date: Dec. 4, 2014

(65) Prior Publication Data
US 2016/0123251 A1 May 5, 2016

(51) Int. Cl.
*F02B 3/00* (2006.01)
*F02D 37/02* (2006.01)
(Continued)

(52) U.S. Cl.
CPC ............. *F02D 37/02* (2013.01); *F02B 5/00* (2013.01); *F02B 9/02* (2013.01); *F02D 35/023* (2013.01);
(Continued)

(58) Field of Classification Search
CPC ...... F02D 41/40; F02D 41/401; F02D 41/403; F02B 17/00
(Continued)

(56) References Cited

U.S. PATENT DOCUMENTS 6,640,773 B2 * 11/2003 Ancimer ............... F02B 1/12
123/299
6,651,623 B1 * 11/2003 Tang ................ B01D 53/9495
123/406.23
(Continued)

FOREIGN PATENT DOCUMENTS

JP 2001-140681 A 5/2001
JP 2003-254105 A 9/2003
(Continued)

*Primary Examiner* — John Kwon
(74) *Attorney, Agent, or Firm* — Finnegan, Henderson, Farabow, Garrett & Dunner, LLP

(57) ABSTRACT

A control system of an internal combustion engine which performs diffusion combustion by compression autoignition on fuel injected in a main injection in at least a partial operating range and which performs stratified combustion by spark ignition using a spark plug on fuel injected prior to the main injection. The control system determines whether or not the diffusion combustion occurs and performs combustion by spark ignition using the spark plug on the fuel injected in the main injection when it is determined that the diffusion combustion does not occur.

6 Claims, 7 Drawing Sheets

(51) Int. Cl.

| | | |
|---|---|---|
| *F02D 41/30* | (2006.01) | |
| *F02D 41/40* | (2006.01) | |
| *F02P 15/08* | (2006.01) | |
| *F02D 35/02* | (2006.01) | |
| *F02B 5/00* | (2006.01) | |
| *F02B 9/02* | (2006.01) | |
| *F02P 5/145* | (2006.01) | |
| *F02P 9/00* | (2006.01) | |

(52) U.S. Cl.
CPC ..... *F02D 41/3005* (2013.01); *F02D 41/3017* (2013.01); *F02D 41/3023* (2013.01); *F02D 41/3076* (2013.01); *F02D 41/402* (2013.01); *F02P 5/145* (2013.01); *F02P 9/002* (2013.01); *F02P 15/08* (2013.01); *F02D 35/025* (2013.01); *Y02T 10/44* (2013.01)

(58) Field of Classification Search
USPC ....... 123/299, 300, 429–431, 434, 436, 676, 123/681, 687
See application file for complete search history.

(56) References Cited

U.S. PATENT DOCUMENTS

| | | | | |
|---|---|---|---|---|
| 7,603,226 | B2* | 10/2009 | Henein | ................ F02D 35/021 |
| | | | | 701/109 |
| 7,845,315 | B2* | 12/2010 | Leone | .................... F01N 3/005 |
| | | | | 123/1 A |
| 9,146,210 | B2* | 9/2015 | Gibson | .............. G01N 27/4067 |
| 9,528,448 | B2* | 12/2016 | Makled | ................. F02D 19/088 |
| 2006/0272616 | A1 | 12/2006 | Kuzuyama | |

FOREIGN PATENT DOCUMENTS

| | | |
|---|---|---|
| JP | 2007-278257 A | 4/2006 |
| JP | 2007-016777 A | 6/2006 |
| JP | 2008-169714 A | 1/2007 |
| JP | 2007-064187 A | 3/2007 |
| JP | 2007-154859 A | 6/2007 |
| JP | 2007-285174 A | 11/2007 |
| JP | 2008-291792 A | 12/2008 |
| JP | 2012-246784 A | 5/2011 |

\* cited by examiner

[FIG. 1]
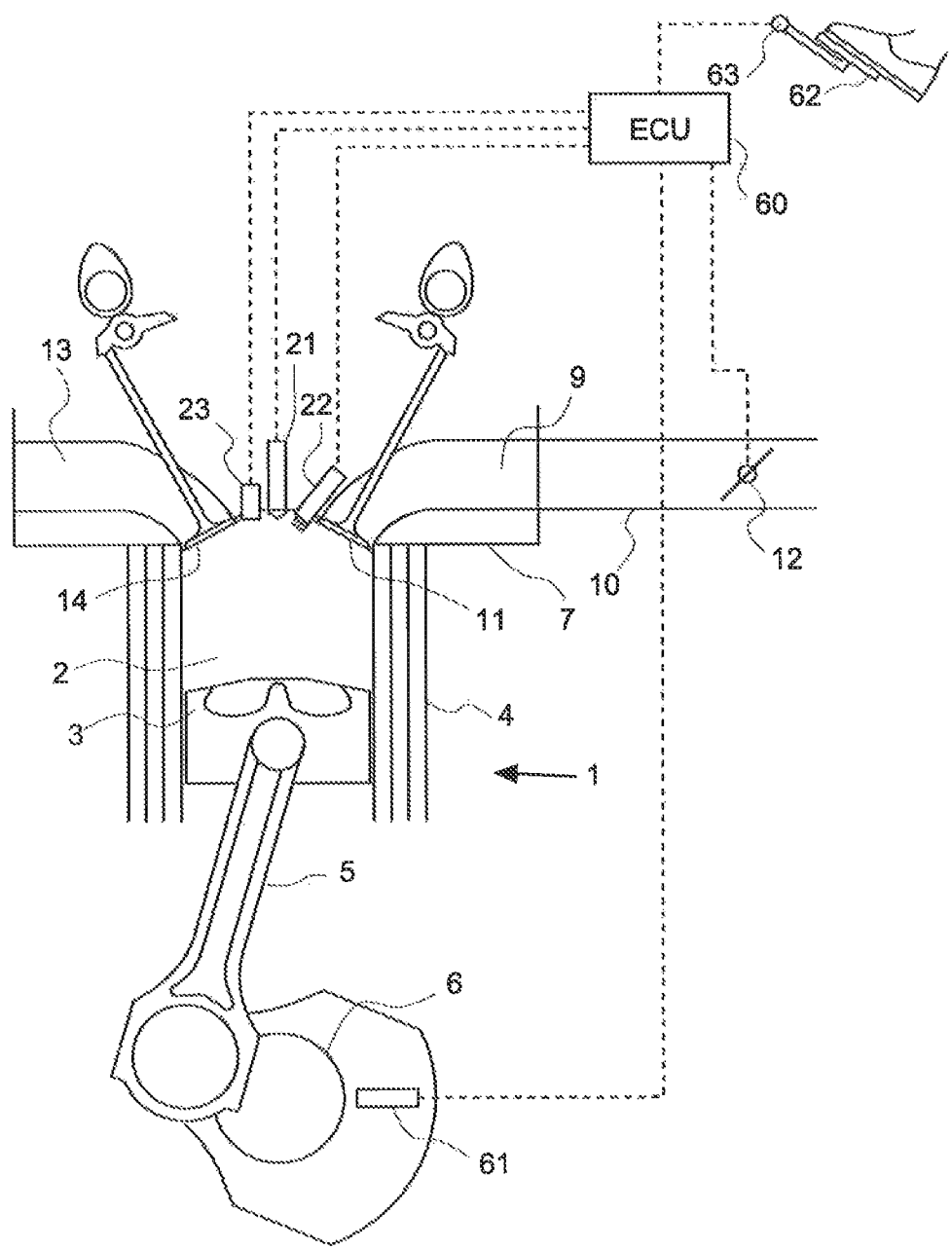

[FIG. 2]
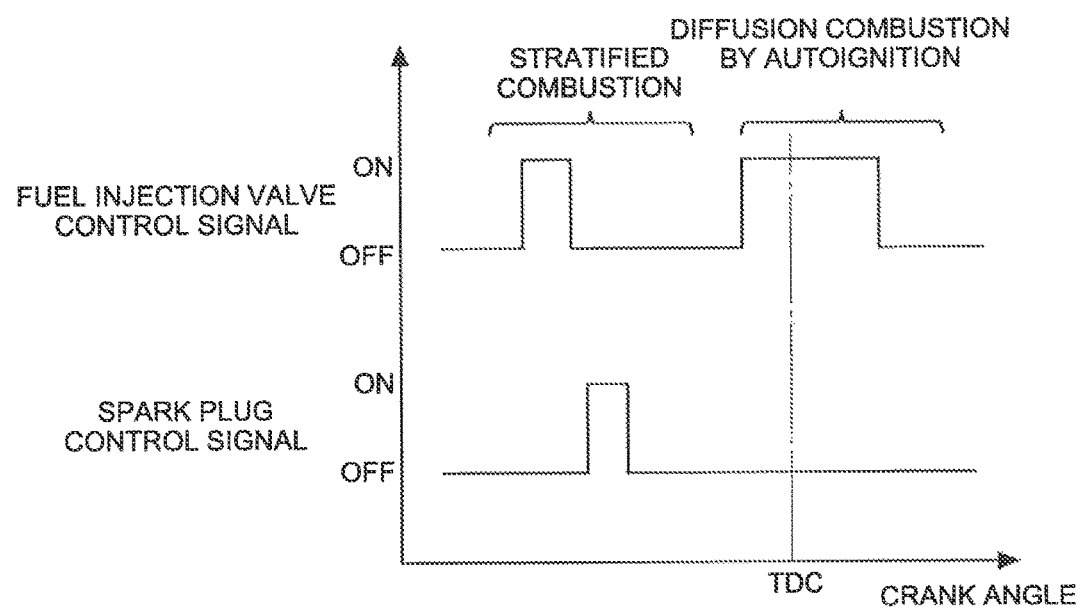

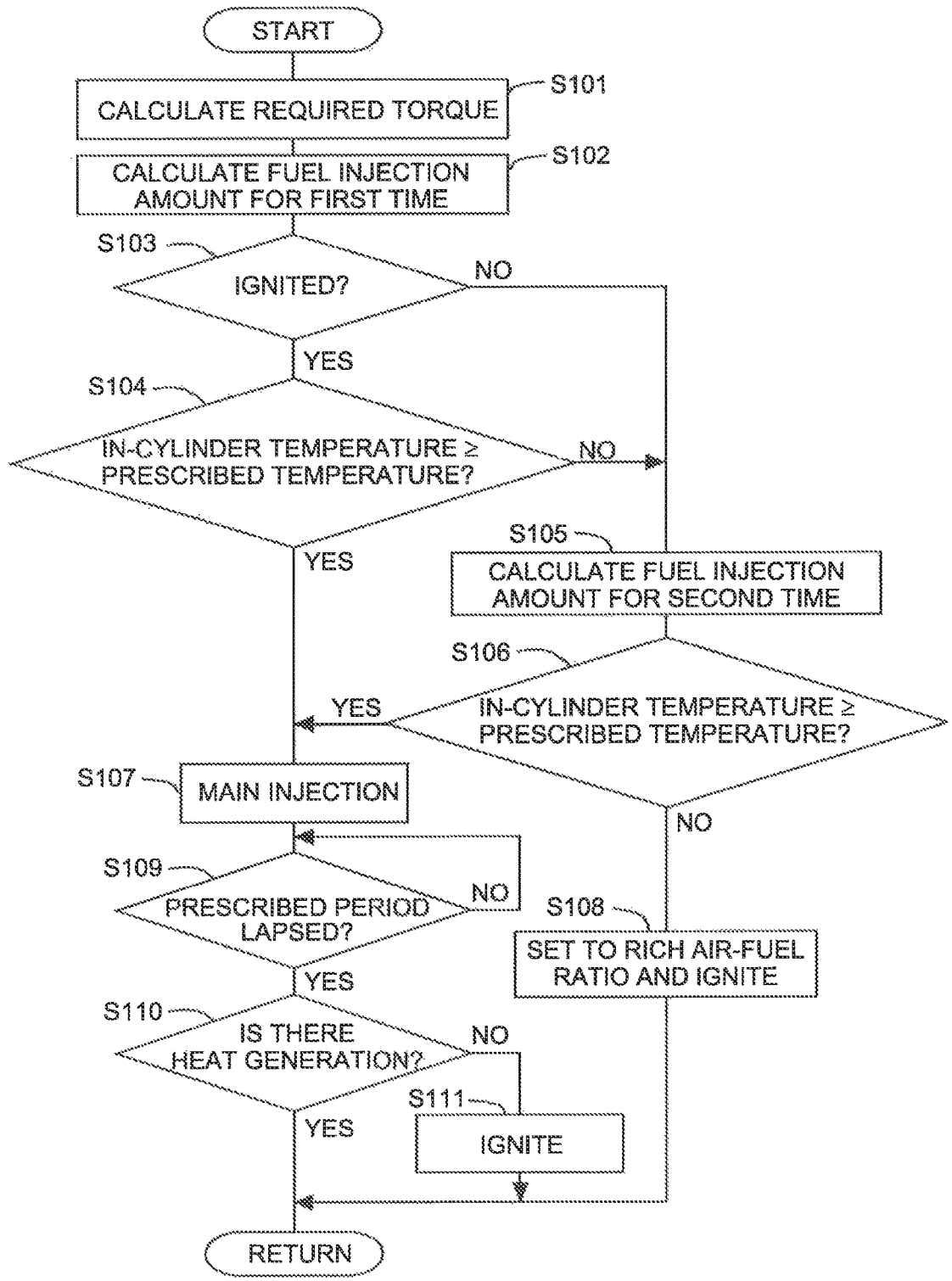
[FIG. 3]

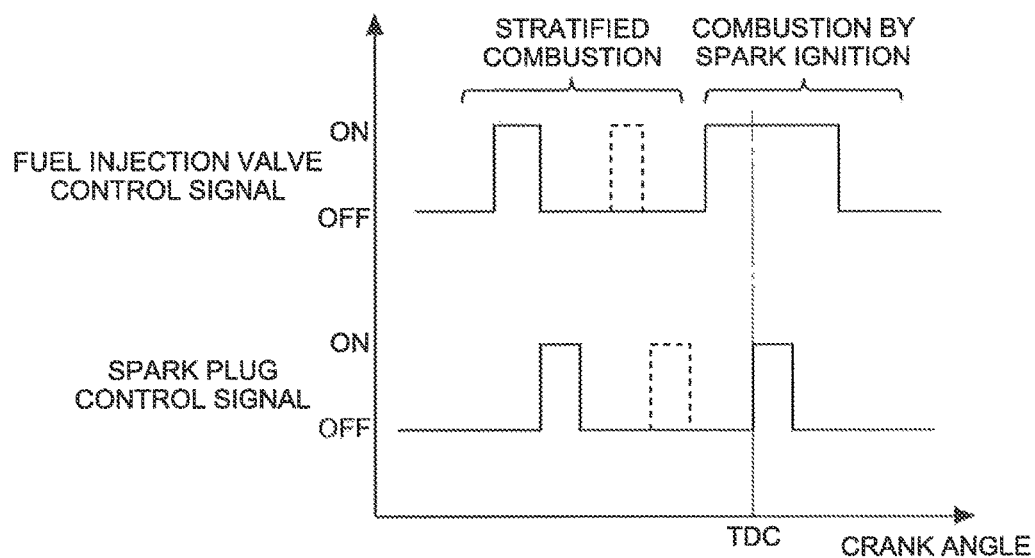
[FIG. 4]
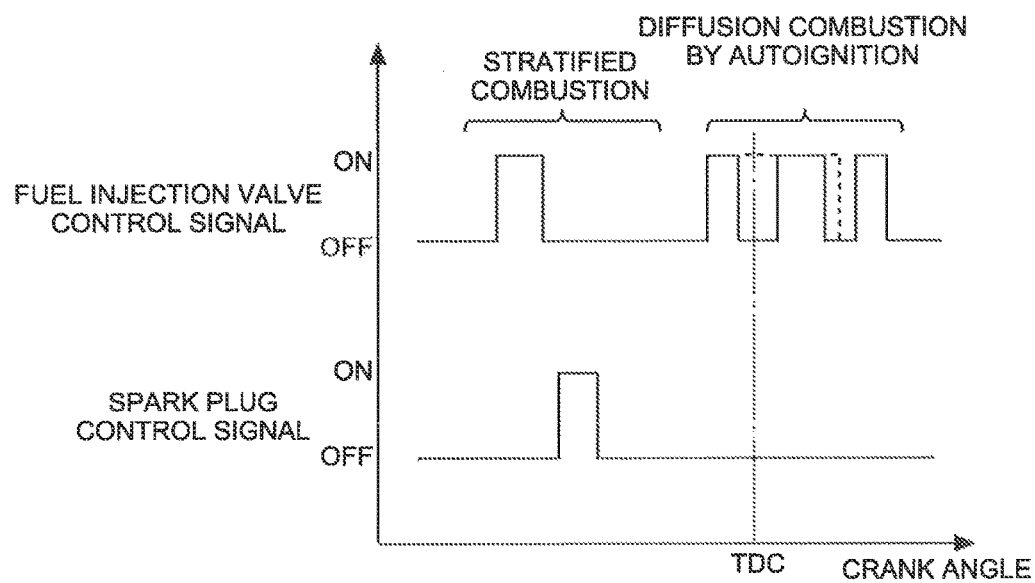
[FIG. 5]

[FIG. 6]
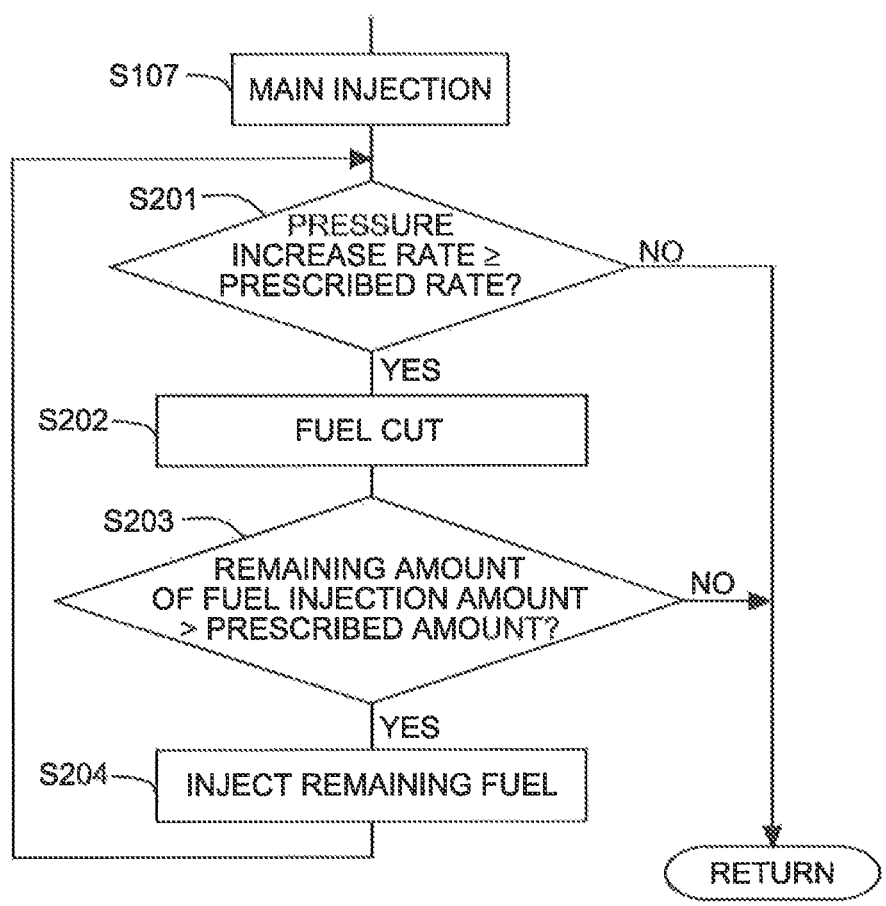

[FIG. 7]
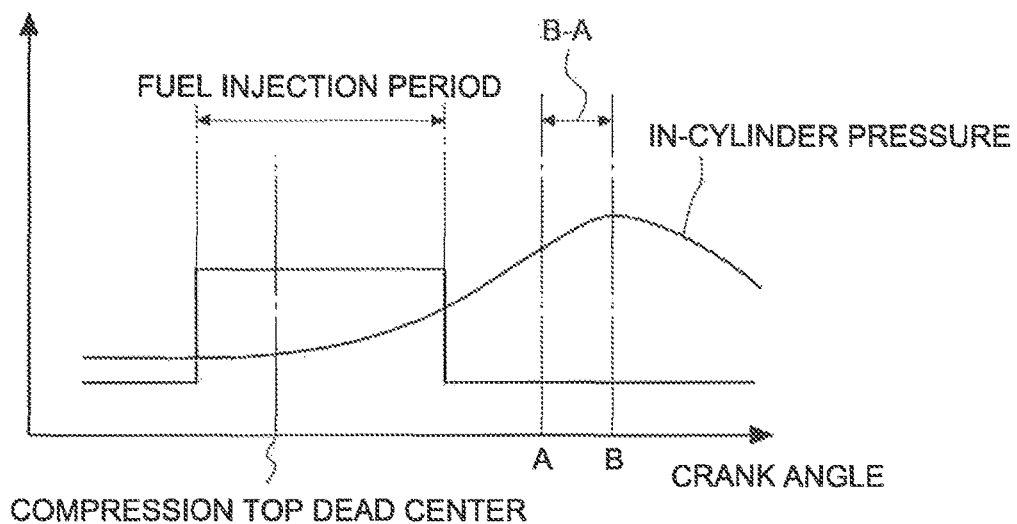
[FIG. 8]
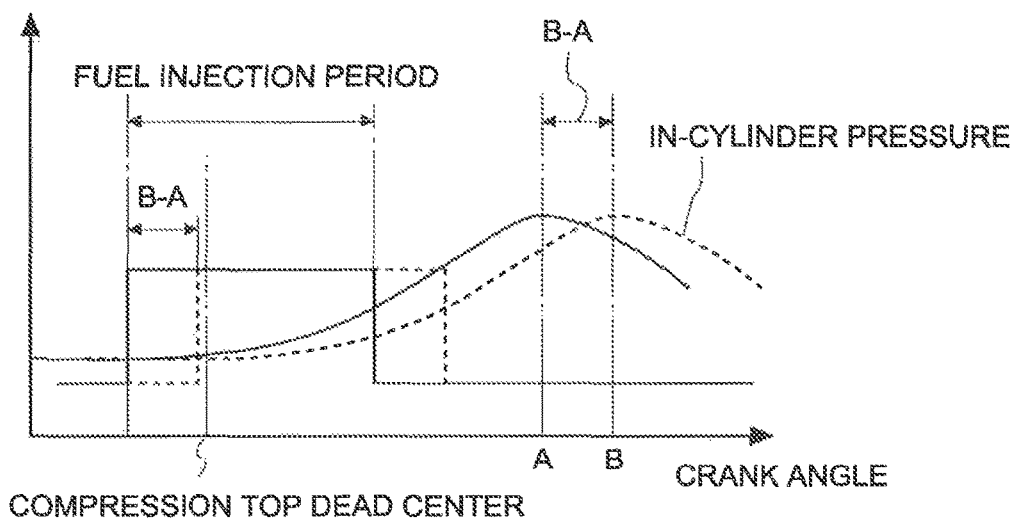

[FIG. 9]
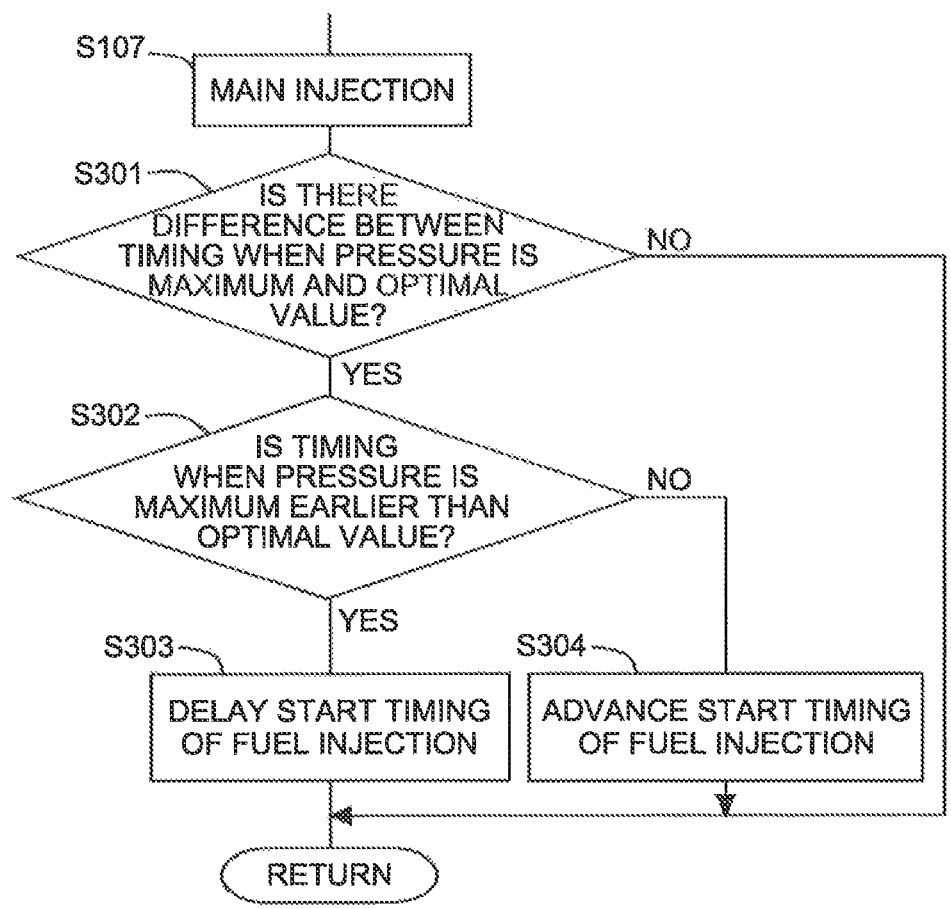

CONTROL SYSTEM OF INTERNAL COMBUSTION ENGINE (AS AMENDED)

CROSS-REFERENCE TO RELATED APPLICATION

This application is a national phase application of International Application No. PCT/JP2013/065242, filed May 31, 2013, the content of which is incorporated herein by reference.

TECHNICAL FIELD

The present invention relates to a control system of an internal combustion engine.

BACKGROUND ART

It is known that after forming an air-fuel mixture around a spark plug and performing spark ignition, fuel is directly injected into a combustion chamber to cause compression autoignition combustion (for example, refer to Patent Document 1).

In addition, it is known that combustion by flame propagation is performed by subjecting an air-fuel premixture to spark ignition during a light-load operation and that diffusion combustion by compression autoignition is performed during a heavy-load operation for example, refer to Patent Document 2). Subsequently, switching between the combustion by flame propagation and the diffusion combustion is performed after forcibly igniting pilot injected fuel to burn an air-fuel mixture and subjecting main injected fuel to compression autoignition diffusion combustion.

Furthermore, it is known that in an operating range in which knocking is likely to occur, a first fuel injection is performed into a cylinder before a compression top dead center in order to burn injected fuel by spark ignition and a second fuel injection is performed after the first fuel injection is completed in order to burn the injected fuel by diffusion combustion (for example, refer to Patent Document 3).

Moreover, it is known that a spark plug is provided so that an ignition electrode unit is positioned inside or in a vicinity of a spray of fuel injected from a fuel injection valve, the fuel is ignited by the spark plug after fuel injection to create a flame, one or more sprays is newly subjected to diffusion combustion by the created flame, and after all injections in a combustion stroke is completed, ignition is newly performed at least one or more times (for example, refer to Patent Document 4).

In addition, it is known that in an internal combustion engine performing homogeneous charge compression ignition (HCCI), when there is a cylinder whose combustion state deviates to a misfiring side from a prescribed range, ignition assistance is performed by a spark plug (for example, refer to Patent Document 5). However, with an internal combustion engine performing homogeneous charge compression ignition, since the inside of the cylinder is uniformly set to an air-fuel ratio (lean air-fuel ratio) that is significantly higher than a stoichiometric air-fuel ratio, ignition using a spark plug is difficult.

Heat efficiency can be increased by performing diffusion combustion by compression autoignition after performing combustion by spark ignition. However, an operating range which satisfies diffusion combustion is narrow. In addition, when the internal combustion engine falls outside of this operating range, there is a possibility that the diffusion combustion may not occur and unburned fuel may be discharged. Furthermore, there is a possibility that the diffusion combustion may not occur due to variations in temperature and pressure inside a combustion chamber after performing the combustion by spark ignition. When diffusion combustion does not occur, since mixing of fuel and air proceeds, there is a possibly that a large amount of fuel may automatically ignite at once in a similar manner to homogeneous charge compression ignition (HCCI). As a result, an abrupt increase in pressure may occur during combustion. In addition, combustion noise may increase due to the increase in pressure.

PRIOR ART REFERENCES

Patent Documents

Patent Document 1: Japanese Patent Application Laid-open No. 2003-254105
Patent Document 2: Japanese Patent Application Laid-open No. 2008-169714
Patent Document 3: Japanese Patent Application Laid-open No. 2007-064187
Patent Document 4: Japanese Patent Application Laid-open No. 2007-278257
Patent Document 5: Japanese Patent Application Laid-open No. 2007-016777

SUMMARY OF THE INVENTION

Problems to be Solved by the Invention

The present invention has been made in consideration of the problems described above and an object thereof is to prevent a misfire and an abrupt increase in pressure.

Means for Solving the Problems

In order to achieve the object described above, the present invention provides
a control system of an internal combustion engine which performs diffusion combustion by compression autoignition on fuel injected in a main injection in at least a partial operating range and which performs stratified combustion by spark ignition using a spark plug on fuel injected prior to the main injection, the control system including:
a determining unit which determines whether or not the diffusion combustion occurs; and
a control unit which performs combustion by spark ignition using the spark plug on the fuel injected in the main injection when the determining unit determines that the diffusion combustion does not occur.

In this case, by performing stratified combustion prior to the main injection, temperature and pressure inside the cylinder increase. Accordingly, diffusion combustion can be readily performed. However, due to a variation in an air-fuel ratio, a variation in temperature or pressure during stratified combustion, and the like, subsequent diffusion combustion by compression autoignition may sometimes be difficult. In other words, there may be cases where diffusion combustion does not occur even when performing main injection. In such cases, there is a possibility of combustion of fuel accompanied by an abrupt increase in pressure or a possibility of a misfire. In contrast, using spark ignition after main injection enables fuel injected in the main injection to be burned more reliably.

Moreover, examples of cases where diffusion combustion does not occur include a case where the temperature inside the cylinder after stratified combustion does not increase to a temperature that enables diffusion combustion and a case where heat is not generated even when a prescribed period lapses after performing main injection. In addition, a case where heat is not generated may be a case where combustion is not detected or a case where an amount of increase in pressure is below a prescribed value.

Furthermore, in the present invention, the determining unit may determine that the diffusion combustion does not occur when, after performing spark ignition using the spark plug in order to perform the stratified combustion, a temperature inside a cylinder of the internal combustion engine is equal to or higher than a prescribed temperature and combustion of the fuel injected in the main injection is not detected within a prescribed period from start of the main injection.

The prescribed temperature in this case can be a temperature which enables diffusion combustion by compression autoignition. Alternatively, the prescribed temperature may be a temperature at which homogeneous charge compression ignition (HCCI) occurs. In addition, the prescribed period can be an upper limit of a period which enables diffusion combustion of fuel injected in a main injection. Alternatively, the prescribed period may be an upper limit of a period from the start of a main injection to detection of combustion of fuel when diffusion combustion occurs. Still alternatively, the prescribed period may be an upper limit of a period from the start of a main injection to detection of generation of heat when diffusion combustion occurs. In other words, when diffusion combustion has not started upon lapse of the prescribed period from the start of a main injection, there is a possibility that a misfire may subsequently occur. In addition, there is a possibility that homogeneous charge compression ignition may occur due to progress in mixing of air and fuel. In this case, even when the temperature inside the cylinder increases to a prescribed temperature due to stratified combustion, subsequent diffusion combustion may be difficult due to one reason or another. In contrast, by burning fuel injected in a main injection by spark ignition using a spark plug, an occurrence of a misfire or homogeneous charge compression ignition can be prevented.

In addition, in the present invention, the determining unit can determine that the diffusion combustion, does not occur when, after performing spark ignition using the spark plug in order to perform the stratified combustion, a temperature inside a cylinder of the internal combustion engine is lower than a prescribed temperature, and the control unit can adjust an amount of the fuel injected in the main injection so that an air-fuel ratio inside the cylinder is lower than a stoichiometric air-fuel ratio, and perform combustion by spark ignition using the spark plug on the fuel injected in the main injection when the determining unit determines that the diffusion combustion does not occur.

The prescribed temperature in this case may be a temperature which enables diffusion combustion by compression autoignition. There may be cases where the temperature does not increase sufficiently even when stratified combustion is performed. When attempting to perform diffusion combustion in such a case, fuel injected in a main injection may burn while being accompanied by an abrupt increase in pressure or a misfire may occur. In contrast, by performing combustion by a spark ignition using a spark plug instead of the diffusion combustion, a misfire or an abrupt increase in pressure due to homogeneous charge compression ignition can be prevented. In addition, since homogeneous charge compression ignition more readily occurs at a higher air-fuel ratio (lean air-fuel ratio) than the stoichiometric air-fuel ratio, by adjusting a fuel amount so that an air-fuel ratio inside the cylinder becomes a lower air-fuel ratio (rich air-fuel ratio) than the stoichiometric air-fuel ratio, an occurrence of homogeneous charge compression ignition can be prevented. Furthermore, by realizing a rich air-fuel ratio, combustion by spark ignition can also be reliably performed.

Furthermore, in the present invention, the control unit can halt the main injection midway when a pressure increase rate in a cylinder of the internal combustion engine after start of the main injection equals or exceeds a prescribed rate.

The pressure increase rate may be an amount of pressure increase per unit time. The prescribed rate in this case can be a pressure increase rate when homogeneous charge compression ignition has occurred or a pressure increase rate when homogeneous charge compression ignition may possibly occur. The prescribed rate is a value larger than the pressure increase rate when diffusion combustion by compression autoignition occurs. Alternatively, the prescribed rate may be a pressure increase rate at which pressure inside the cylinder may possibly exceed an allowable range. In this case, when the pressure increase rate is high during the main injection, there is a possibility that homogeneous charge compression ignition is taking place. When the main injection is continued in such a case, pressure may further increase and combustion noise may increase. In contrast, by halting the main injection midway, a subsequent increase in pressure can be prevented.

In addition, in the present invention, the control unit can restart the main injection after halting the main injection midway.

When the main injection is halted midway, a fuel injection amount becomes deficient with respect to required torque. In contrast, by restarting the main injection, the deficiency of the fuel injection amount with respect to the required torque can be compensated. Furthermore, when the pressure increase rate inside the cylinder of the internal combustion engine equals or exceeds a prescribed rate after restarting the main injection, the main injection can be halted once again. In this manner, the main injection can be performed in a plurality of stages until a fuel injection amount corresponding to the required torque is reached. Moreover, when a remaining amount of fuel injected in the main injection is smaller than a fuel injection amount that can be subjected to diffusion combustion, the remaining amount of fuel need not be injected.

Furthermore, in the present invention, the control unit can perform the stratified combustion a plurality of times until a temperature inside a cylinder of the internal combustion engine equals or exceeds a prescribed temperature before start of the main injection.

The prescribed temperature in this case may be a temperature which enables diffusion combustion by compression autoignition. By raising the temperature inside the cylinder to or above the prescribed temperature in this manner, diffusion combustion by compression autoignition can be more reliably performed. The temperature inside the cylinder is detected every time stratified combustion is performed, and when the temperature inside the cylinder is lower than the prescribed temperature, the stratified combustion is performed once again. The stratified combustion can be repetitively performed until the main injection is performed. In addition, when temperature inside the cylinder is lower than the prescribed temperature even after performing the stratified combustion a plurality of times, a misfire or an abrupt increase in pressure due to homogeneous charge compression ignition can be prevented by performing combustion by spark ignition.

Effect of the Invention

According to the present invention, a misfire or an abrupt increase in pressure can be prevented.

BRIEF DESCRIPTION OF THE DRAWINGS

FIG. 1 is a diagram for explaining a system configuration of a first embodiment;

FIG. 2 is a diagram showing a relationship between a fuel injection timing and an ignition timing according to the first embodiment;

FIG. 3 is a flow chart showing a control flow of a fuel injection valve and a spark plug according to the first embodiment;

FIG. 4 is a diagram showing a relationship between a fuel injection timing and an ignition timing in step S108;

FIG. 5 is a diagram showing a relationship between a fuel injection timing and an ignition timing according to a second embodiment;

FIG. 6 is a flow chart showing a control flow of a fuel injection valve and a spark plug according to the second embodiment;

FIG. 7 is a diagram showing a relationship between a fuel injection timing and in-cylinder pressure according to a third embodiment;

FIG. 8 is a diagram showing a relationship between a fuel injection timing and in-cylinder pressure in a cycle following a cycle shown in FIG. 7; and FIG. 9 is a flow chart showing a control flow of a fuel injection valve and a spark plug according to the third embodiment.

MODES FOR CARRYING OUT THE INVENTION

Hereinafter, modes for implementing the invention will be described in detail by way of example of embodiments with reference to the drawings. However, it is to be understood that dimensions, materials, shapes, relative arrangements, and the like of components described in the embodiments are not intended to limit the scope of the invention thereto unless otherwise noted.

(First Embodiment)

FIG. 1 is a diagram for explaining a system configuration of the present embodiment. In the present actual example, an internal combustion engine 1 is provided. The internal combustion engine 1 is a gasoline engine. FIG. 1 only shows one cylinder along a plurality of cylinders 2. The internal combustion engine 1 is mounted on, for example, a vehicle.

The internal combustion engine 1 includes a cylinder block 4 having an internal piston 3. The piston 3 is connected to a crankshaft 6 via a connecting rod 5. A crank angle sensor 61 is provided in a vicinity of the crankshaft 6. The crank angle sensor 61 detects a rotational angle fin other words, a crank angle) of the crankshaft 6).

A cylinder head 7 is installed to an upper part of the cylinder block 4. The cylinder head 7 includes an intake port 9 communicating with the inside of the cylinder 2. In addition, an intake pipe 10 is connected to the cylinder head 7. The intake port 9 communicates the intake pipe 10 to the inside of the cylinder 2. An intake valve 11 is provided at a connecting part of the intake port 9 and the inside of the cylinder 2.

In addition, the cylinder head 7 includes an exhaust port 13 communicating with the inside of the cylinder 2. An exhaust valve 14 is provided at a connecting part of the exhaust port 13 and the inside of the cylinder 2.

Furthermore, a fuel injection valve 21 that directly injects fuel into the cylinder 2, a spark plug 22 that generates an electric spark inside the cylinder 2, and a pressure sensor 23 that measures pressure inside the cylinder 2 are attached to the internal combustion engine 1. For example, the spark plug 22 is provided so that a spark is generated inside or in a vicinity of a spray of fuel injected from the fuel injection valve 21.

In addition, the system according to the present embodiment includes an ECU 60 as an electronic control apparatus. A throttle 12, the fuel injection valve 21, the spark plug 22, and the like are connected to an output side of the ECU 60. In addition to the sensors described above, an accelerator depression amount sensor 63 that outputs an electric signal corresponding to an amount by which an accelerator pedal 62 is depressed by a driver and the like are connected to an input side of the ECU 60. Based on output from each sensor, the ECU 60 executes control of the entire internal combustion engine 1 including fuel injection control and ignition timing control.

In addition, by controlling the fuel injection valve 21 and the spark plug 22, the ECU 60 forms an air-fuel mixture in a range where stratified combustion can be performed inside the cylinder 2 and subjects the air-fuel mixture to stratified combustion by spark ignition. Furthermore, in a same cycle, after performing the stratified combustion, the ECU 60 further performs fuel injection to perform diffusion combustion by compression autoignition. For example, fuel injection and spark ignition for the stratified combustion are performed before a compression top dead center and fuel injection for the diffusion combustion is performed near the compression top dead center or after the compression top dead center. The diffusion combustion by compression autoignition which is performed after performing the stratified combustion as described above may be performed in a partial operating range or in the entire operating range.

In this case, as a result of the stratified combustion by spark ignition, a temperature and pressure inside the cylinder 2 increase. Accordingly, when subsequently performing fuel injection, a period of time from fuel injection to autoignition can be reduced. In addition, the diffusion combustion by compression autoignition can be performed more reliably.

Moreover, the stratified combustion can be performed by, for example, a spray-guided system, an air-guided system, or a wall-guided system. With the spray-guided system, a distance between the fuel injection valve 21 and the spark plug 22 is relatively short and an air-fuel mixture is formed by a spray. In addition, the spark plug 22 is provided so that a spark is generated inside or in a vicinity of a spray of fuel injected from the fuel injection valve 21. Furthermore, with the air-guided system, a spray of fuel is guided to the spark plug 22 by a gas flow inside the cylinder 2. Moreover, with the wall-guided system, a spray of fuel is guided to the spark plug 22 using a shape of a cavity formed in the piston 3. In the present embodiment, the stratified combustion is to be performed by the spray-guided system.

By performing the diffusion combustion by compression autoignition in a gasoline engine, prevention of a misfire, prevention of an occurrence of intense knocking, prevention of a reduction in torque, and the like can be achieved. In addition, heat efficiency can be increased as compared to a case where all fuel is burned by spark ignition.

In this manner, the ECU 60 performs diffusion combustion by compression autoignition in a gasoline engine. Moreover, the diffusion combustion according to the present embodiment refers to a situation where a tip of a spray of fuel injected from the fuel injection valve 21 is automatically ignited and combustion is sequentially performed starting at a part where fuel and air are mixed. The diffusion combustion differs from combustion in which a large amount of fuel is automatically ignited at the same time in a state where concentration of an air-fuel mixture inside the cylinder 2 is uniform such as homogeneous charge compression ignition (HCCI).

When a temperature increase amount or a pressure increase amount during stratified combustion changes, a time from injection of fuel for diffusion combustion to generation of heat (hereinafter, also referred to as an ignition delay time) changes. A longer ignition delay time may result in making diffusion combustion difficult and may cause an occurrence of a misfire. In addition, since a longer ignition delay time causes an air-fuel ratio in the cylinder 2 to become more uniform, there is a possibility that homogeneous charge compression ignition may occur and pressure may increase abruptly.

In contrast, when heat is not generated even after a prescribed time lapses from injection of fuel for diffusion combustion from the fuel injection valve 21, the ECU 60 performs spark ignition using the spark plug 22. In other words, when the ignition delay time is equal to or longer than a prescribed time, fuel is ignited by generating an electric spark using the spark plug 22. Accordingly, since an occurrence of homogeneous charge compression ignition is prevented, an abrupt increase in pressure can be prevented.

Moreover, whether or not heat is generated inside the cylinder 2 is determined based on a rate of increase or an amount of increase of pressure as measured by the pressure sensor 23. In addition, when the temperature inside the cylinder 2 after the stratified combustion has not reached a temperature that enables diffusion combustion, diffusion combustion does not occur even when fuel injection for diffusion combustion is performed. In this case, the stratified combustion may be performed once again to increase the temperature inside the cylinder 2. In other words, the stratified combustion can be performed two or more times in one cycle. Furthermore, when the temperature inside the cylinder 2 after performing the stratified combustion once or a plurality of times has not reached a temperature that enables diffusion combustion, combustion by spark ignition can be performed in place of diffusion combustion.

FIG. 2 is a diagram showing a relationship between a fuel injection timing and an ignition timing according to the present embodiment. A horizontal axis represents a crank angle. A "fuel injection valve control signal" represents a signal for opening or closing the fuel injection valve 21, wherein the fuel injection valve 21 is opened when ON and closed when OFF. A "spark plug control signal" represents a signal that causes the sparkplug 22 to generate an electric spark, wherein an electric spark is generated when ON and an electric spark is not generated when OFF. In addition, a one-dot chain line represents a compression top dead center.

A first fuel injection shown in FIG. 2 is fuel injection for stratified combustion. Ignition using the spark plug 22 is performed in accordance with the fuel injection for the stratified combustion. The stratified combustion is performed before the compression top dead center. In addition, a second fuel injection is fuel injection for diffusion combustion by compression autoignition. The fuel injection for the diffusion combustion is started from a vicinity of the compression top dead center. Moreover, the fuel injection for the diffusion combustion may be started before the compression top dead center or may be started after the compression top dead center.

FIG. 3 is a flow chart showing a control flow of the fuel injection valve 21 and the spark plug 22 according to the present embodiment. The present routine is executed every prescribed time by the ECU 60.

In step S101, a required torque is calculated. The required torque is detected by the accelerator depression amount sensor 63. In addition, a fuel injection amount per one cycle is calculated based on the required torque. The fuel injection amount is a value obtained by adding up fuel injected during stratified combustion and fuel injected during diffusion combustion. Furthermore, the fuel injection amount is determined so that a higher air-fuel ratio (lean air-fuel ratio) than a stoichiometric air-fuel ratio is realized. Once the process of step S101 is completed, the present routine proceeds to step S102.

In step S102, a fuel injection amount for the stratified combustion is calculated. Moreover, the fuel injection amount for the stratified combustion may be a constant value or may be determined in accordance with an intake air amount of the internal combustion engine 1. In this case, heat necessary for performing the diffusion combustion varies depending on the intake air amount. In other words, since the temperature of air inside the cylinder 2 must be increased to a temperature that enables the diffusion combustion, the larger the intake air amount, the more fuel is required. Therefore, heat for performing the diffusion combustion may be obtained based on the intake air amount and a fuel injection amount for generating the heat may be calculated as the fuel injection amount for the stratified combustion. In addition, when a constant value is adopted as the fuel injection amount, the constant value is set so that the diffusion combustion can be subsequently performed regardless of the value of the intake air amount of the internal combustion engine 1. Optimal values thereof may be obtained by an experiment, a simulation, or the like in advance to be mapped and stored in one ECU 60. When the fuel injection amount is calculated, fuel injection for the stratified combustion is performed in accordance with the fuel injection amount. Subsequently, spark ignition using the spark plug 22 is performed. In this manner, the stratified combustion is performed in the present step. Once the process of step S102 is completed, the present routine proceeds to step S103.

In step S103, a determination is made on whether or not ignition has been performed. In other words, a determination is made on whether or not fuel for the stratified combustion had actually burned. Moreover, in the present step, it is determined that ignition has been performed when an amount of pressure increase inside the cylinder 2 at a prescribed time after injection of the fuel for the stratified combustion is equal to or larger than a prescribed amount.

When a positive determination is made in step S103, the present routine proceeds to step S104. In addition, in step S104, a determination is made on whether or not the temperature inside the cylinder 2 is equal to or higher than a prescribed temperature. The prescribed temperature in this case is a temperature which enables diffusion combustion. In other words, when the temperature inside the cylinder 2 has not reached a prescribed temperature, diffusion combustion is unlikely to occur even when fuel injection is subsequently performed. In such a case, diffusion combustion is not performed. The temperature inside the cylinder 2 can be estimated based on pressure inside the cylinder 2. Alternatively, a sensor that measures the temperature inside the cylinder 2 may be installed.

When a positive determination is made in step S104, the present routine proceeds to step S107. On the other hand, when a negative determination is made in step S103 or S104, the present routine proceeds to step S105. In step S105, a fuel injection amount for a second stratified combustion is calculated. In other words, the second stratified combustion is performed when fuel for the first stratified combustion was not ignited or when an increase in temperature inside the cylinder 2 is insufficient. Moreover, in the present step, the fuel injection amount may be calculated in a similar manner to step S102. In addition, since a case is conceivable where the temperature had increased by a certain amount due to the first stratified combustion, the fuel injection amount may be set smaller than that in step S102. When the fuel injection amount is calculated, fuel injection for the stratified combustion is performed in accordance with the fuel injection amount. Subsequently, spark ignition using the spark plug 22 is performed. In this manner, the stratified combustion is performed in the present step. Once the process of step S105 is completed, the present routine proceeds to step S106.

In step S106, a determination is made on whether or not the temperature inside the cylinder 2 is equal to or higher than a prescribed temperature in a similar manner to step S104. When a positive determination is made in step S106, the flow proceeds to step S107.

In step S107, fuel injection (main injection) for the diffusion combustion is performed. A fuel injection amount at this point is a value obtained by subtracting the fuel amounts that are injected in steps S102 and S105 from the fuel amount in accordance with the required torque calculated in step S101. Once the process of step S107 is completed, the present routine proceeds to step S109.

On the other hand, when a negative determination is made in step S106, the flow proceeds to step S108. In this case, a condition for the occurrence of diffusion combustion is not satisfied. In step S108, fuel is injected so that the air-fuel ratio inside the cylinder 2 becomes an air-fuel ratio (rich air-fuel ratio) that is lower than the stoichiometric air-fuel ratio and, furthermore, spark ignition using the spark plug 22 is performed. At this point, the fuel injection amount is adjusted so that the air-fuel ratio takes a value between, for example, 9 and 14.5.

FIG. 4 is a diagram showing a relationship between a fuel injection timing and an ignition timing in step S108. Differences from FIG. 2 will be mainly described. In FIG. 4, a dashed line represents a fuel injection valve control signal and a spark plug control signal for a second stratified combustion when performing the stratified combustion twice in one cycle.

The fuel injection for the stratified combustion in step S108 shown in FIG. 4 is the same as that shown in FIG. 2. On the other hand, in step S108, fuel injection for combustion by spark ignition is performed after the compression top dead center. The fuel injection for the combustion by spark ignition is started from a vicinity of the compression top dead center. In addition, the spark ignition is performed in accordance with the fuel injection for the combustion by spark ignition. As described above, once the present routine proceeds to step S108, the fuel injected into the cylinder 2 is all burned by spark ignition.

As described above, when it is conceivably difficult to perform the diffusion combustion, the present routine advances to step S108 to perform spark ignition. In this case, homogeneous charge compression ignition generally occurs at or above the stoichiometric air-fuel ratio. Therefore, by adjusting the fuel injection amount so as to realize an air-fuel ratio (rich air-fuel ratio) that is lower than the stoichiometric air-fuel ratio, an occurrence of homogeneous charge compression ignition can be prevented. Accordingly, an abrupt increase in pressure can be prevented. In addition, since a state in which combustion by spark ignition is more likely to occur is created by realizing a rich air-fuel ratio, fuel can be burned more reliably. Once the process of step S108 is completed, the present routine is ended.

In addition, in step S109, a determination is made on whether or not a prescribed period has lapsed from the start of fuel injection in step S107. The prescribed period can be an upper limit of a period which enables diffusion combustion of fuel injected in the main injection. Alternatively, the prescribed period may be an upper limit of a period from the start of the main injection to generation of heat when diffusion combustion occurs. Still alternatively, the prescribed period may be an ignition delay time when diffusion combustion occurs. In other words, when diffusion combustion has not started upon lapse of the prescribed period from the start of main injection, there is a possibility that a misfire may subsequently occur. In addition, there is a possibility that homogeneous charge compression ignition may occur as premixing proceeds. Moreover, since there is a correlation between the temperature inside the cylinder 2 and the ignition delay time, the prescribed period is calculated based on the temperature inside the cylinder 2. This relationship is to be obtained in advance by an experiment, a simulation, or the like and stored in the ECU 60. When a positive determination is made in step S109, the present routine advances to step S110, and when a negative determination is made, step S109 is processed once again.

In step S110, a determination is made on whether or not heat has been generated. In other words, a determination is made on whether or not the diffusion combustion has actually been performed. In the present step, a determination is made that heat has been generated when a rate of increase or an amount of increase of pressure inside the cylinder 2 is equal to or greater than a prescribed value. The prescribed value is to be obtained in advance by an experiment, a simulation, or the like and stored in the ECU 60 as a value upon generation of heat. Moreover, for the diffusion combustion to occur, autoignition must occur during fuel injection. Therefore, in the present step, a determination on whether or not heat has been generated may be made during a period in which fuel injection for the diffusion combustion is being performed. When a positive determination is made in step S110, the present routine is ended. On the other hand, when a negative determination is made, the present routine proceeds to step S111.

In step S111, spark ignition using the spark plug 22 is performed. In step S111, a condition for the occurrence of the diffusion combustion is not satisfied. In other words, since there is a possibility that homogeneous charge compression ignition or a misfire may occur, fuel is burned by spark ignition.

Moreover, in the present embodiment, the ECU 60 that processes steps S102 and S105 corresponds to the control unit according to the present invention. In addition, in the present embodiment, the ECU 60 that processes step S106 or S110 corresponds to the determining unit according to the present invention. Furthermore, in the present embodiment, the ECU 60 that processes step S108 or S111 also corresponds to the control unit according to the present invention.

In addition, while the second stratified combustion is performed in step S105 when a negative determination is made in step S104 in the present embodiment, the routine may proceed to step S108 without processing steps S105 and S106. In this case, the ECU 60 that processes step S104 corresponds to the determining unit according to the present invention. Furthermore, when a negative determination is made in step S106, a third stratified combustion may be performed.

As described above, according to the present embodiment, if the condition of an occurrence of diffusion combustion is not satisfied when the diffusion combustion is performed after stratified combustion, an occurrence of homogeneous charge compression ignition or a misfire can be prevented by performing spark ignition. In addition, by performing the stratified combustion a plurality of times, the condition of an occurrence of diffusion combustion can be satisfied more easily. Furthermore, when the temperature of the cylinder 2 does not increase to a temperature at which the diffusion combustion occurs even after performing the stratified combustion, an occurrence of homogeneous charge compression ignition or a misfire can be prevented by realizing a rich air-fuel ratio.

(Second Embodiment)

In the present embodiment, when pressure increase inside the cylinder 2 is abrupt during fuel injection amount for diffusion combustion, the fuel injection is halted midway. In other words, main injection is halted midway. Since other devices and the like are the same as those of the first embodiment, a description thereof will be omitted.

When pressure increase inside the cylinder 2 is abrupt during fuel injection for diffusion combustion, homogeneous charge compression ignition has conceivably occurred. In such a case, continuing the fuel injection causes a further increase in pressure. In consideration thereof, in the present embodiment, when an increase rate (an increase amount per unit time) of pressure inside the cylinder 2 is equal to or higher than a prescribed rate, fuel injection for diffusion combustion is halted even when the fuel injection is in progress.

FIG. 5 is a diagram showing a relationship between a fuel injection timing and an ignition timing according to the present embodiment. A solid line represents fuel injection according to the present embodiment and a dashed line represents fuel injection according to the first embodiment. A fuel injection valve control signal and a spark plug control signal for a first fuel injection are the same as those in the first embodiment.

When the fuel injection for the diffusion combustion is halted midway, a required torque can no longer be obtained. Therefore, in the present embodiment, subsequently, fuel injection for the diffusion combustion is performed once again. Even during a fuel re-ignition, when the increase rate of pressure inside the cylinder 2 is equal to or higher than the prescribed rate, the fuel injection is halted. Moreover, in the case shown in FIG. 5, fuel injection for diffusion combustion is performed three times.

FIG. 6 is a flow chart showing a control flow of the fuel injection valve 21 and the spark plug 22 according to the present embodiment. The present routine is executed every prescribed time by the ECU 60. Moreover, steps in which same processes as those in the embodiment described earlier are performed will be denoted by same reference characters and a description thereof will be omitted. In addition, since processes preceding step S107 are the same as those shown in FIG. 3, the processes are not shown. Moreover, in the present embodiment, the ECU 60 that processes the routine shown in FIG. 6 corresponds to the control unit according to the present invention.

In the present routine, once the process of step S107 is completed, the present routine proceeds to step S201. In step S201, a determination is made on whether or not an increase rate of pressure inside the cylinder 2 is equal to or higher than a prescribed rate. In the present step, a determination is made on whether or not there is an abrupt increase in pressure. The prescribed rate in this case may be a pressure increase rate when homogeneous charge compression ignition is in progress or a pressure increase rate when homogeneous charge compression ignition may possibly occur. Alternatively, the prescribed rate may be a pressure increase amount per unit time when combustion noise of the internal combustion engine 1 exceeds an allowable range. The prescribed rate is to be obtained in advance by an experiment, a simulation, or the like and stored in the ECU 60.

When a positive determination is made in step S201, the present routine advances to step S202, and when a negative determination is made, the present routine is ended.

In step S202, a fuel cut is performed. In other words, fuel injection is halted midway along the fuel injection (main injection) for diffusion combustion. Accordingly, an increase in pressure inside the cylinder 2 is prevented. Once the process of step S202 is completed, the present routine proceeds to step S203.

In step S203, a determination is made on whether or not a remaining amount of a fuel injection amount for diffusion combustion is larger than a prescribed amount. The prescribed amount in this case is an upper limit value of a fuel injection amount at which diffusion combustion does not occur even when fuel injection is performed. In the present embodiment, when fuel injection for diffusion combustion is halted midway, remaining fuel is injected in the same cycle. However, if the fuel injection amount is too small, diffusion combustion becomes difficult. Therefore, when the diffusion combustion is difficult, fuel injection is not performed.

When a positive determination is made in step S203, the present routine advances to step S204, and when a negative determination is made, the present routine is ended.

In step S204, the remaining fuel for diffusion combustion is injected. Once the process of step S204 is completed, the present routine returns to step S201. Accordingly, when there is an abrupt pressure increase during fuel injection for a second diffusion combustion, the fuel injection is halted once again. Accordingly, there may be cases where fuel injection for diffusion combustion is performed a plurality of times in one cycle.

As described above, according to the present embodiment, since an occurrence of homogeneous charge compression ignition can be prevented due to fuel injection for diffusion combustion, an abrupt pressure increase can be prevented. Accordingly, combustion noise can be reduced.

(Third Embodiment)

In the present embodiment, a fuel injection timing during diffusion combustion of a next cycle is determined based on a timing when pressure inside the cylinder 2 during diffusion combustion reaches maximum. Since other devices and the like are the same as those of the first embodiment, a description thereof will be omitted.

In the present embodiment, a fuel injection timing of a next cycle is adjusted so that a timing when pressure reaches maximum during diffusion combustion of the next cycle is a timing with higher combustion efficiency. Therefore, the fuel injection timing of the next cycle is adjusted so as to eliminate a difference in a current cycle between a timing when pressure reaches maximum and a timing when pressure reaches maximum in a case where highest combustion efficiency is realized.

FIG. 7 is a diagram showing a relationship between a fuel injection timing and in-cylinder pressure according to the present embodiment. A horizontal axis represents a crank angle. In FIG. 7, A denotes a timing when in-cylinder pressure reaches maximum in a case where highest combustion efficiency is realized (hereinafter, also referred to as an optimal value). In addition, B denotes a timing when actually-measured in-cylinder pressure reaches maximum. As shown, when the timing when measured pressure reaches maximum is later than an optimal value, the timing when in-cylinder pressure reaches maximum is advanced by advancing a fuel injection timing.

FIG. 8 is a diagram showing a relationship between a fuel injection tinning and in-cylinder pressure in a cycle following the cycle shown in FIG. 7. A solid line represents a next cycle and a dashed line represents a current cycle. A start timing of fuel injection is advanced only during a period equal to a difference between B and A (B−A) shown in FIG. 7. Alternatively, an advance amount of the fuel injection timing may be determined based on the difference between B and A shown in FIG. 7 according to a relationship obtained in advance. In addition, when the timing when measured pressure reaches maximum is delayed from an optimal value, a start timing of fuel injection may be advanced by a certain amount.

In a similar manner, when the timing when measured pressure reaches maximum is earlier than an optimal value, a fuel injection timing during diffusion combustion of a next cycle is delayed.

FIG. 9 is a flow chart showing a control flow of the fuel injection valve 21 and the spark plug 22 according to the present embodiment. The present routine is executed every prescribed time by the ECU 60. Moreover, steps in which same processes as those in the embodiments described earlier are performed will be denoted by same reference characters and a description thereof will be omitted. In addition, since processes preceding step S107 are the same as those shown in FIG. 3, the processes are not shown.

In the present routine, once the process of step S107 is completed, the present routine proceeds to step S301. In step S301, a determination is made on whether or not there is a difference in a previous cycle between a timing when pressure inside the cylinder 2 reaches maximum and an optimal value. In the present step, a determination is made on whether or not the timing when pressure inside the cylinder 2 reaches maximum deviates from the optimal value. The optimal value is to be obtained in advance by an experiment, a simulation, or the like and stored in the ECU 60. Moreover, the optimal value may have a certain width. In addition, the previous cycle may be a previous cycle in the cylinder 2 or may be a cycle in a previous explosion cylinder.

When a positive determination is made in step S301, the present routine advances to step S302, and when a negative determination is made, the present routine is ended.

In step S302, a determination is made on whether or not the timing when pressure inside the cylinder 2 reaches maximum is earlier than the optimal value. When a positive determination is made in step S302, the present routine advances to step S303 to delay a start timing of fuel injection. In other words, since the timing when pressure inside the cylinder 2 reaches maximum is earlier than the optimal value, the start timing of fuel injection is delayed so as to delay the timing when pressure inside the cylinder 2 reaches maximum. At this point, the start timing of fuel injection may be delayed only during a period corresponding to a difference between the timing when pressure inside the cylinder 2 reaches maximum and the optimal value. In addition, the start timing of fuel injection may be delayed based on the difference between the timing when pressure inside the cylinder 2 reaches maximum and the optimal value according to a relationship set in advance.

On the other hand, when a negative determination is made in step S302, the present routine advances to step S304 to advance the start timing of fuel injection. In other words, since the timing when pressure inside the cylinder 2 reaches maximum is later than the optimal value, the start timing of fuel injection is advanced so that the timing when pressure inside the cylinder 2 reaches maximum occurs earlier. At this point, the start timing of fuel injection may be advanced only during a period corresponding to a difference between the timing when pressure inside the cylinder 2 reaches maximum and the optimal value. In addition, the start timing of fuel injection may be advanced based on the difference between the timing when pressure inside the cylinder 2 reaches maximum and the optimal value according to a relationship set in advance.

As described above, according to the present embodiment, since a timing when pressure inside the cylinder 2 reaches maximum becomes an optimal value by adjusting a start timing of fuel injection, combustion efficiency can be increased. As a result, fuel consumption can be improved.

EXPLANATION OF REFERENCE NUMERALS AND CHARACTERS 1 internal combustion engine
2 cylinder
3 piston
6 crankshaft
9 intake port
10 intake pipe
11 intake valve
12 throttle
13 exhaust port
14 exhaust valve
21 fuel injection valve
22 spark plug
23 pressure sensor
60 ECU
61 crank angle sensor
62 accelerator pedal
63 accelerator depression amount sensor

The invention claimed is:

1. A control system of an internal combustion engine which performs diffusion combustion by compression autoignition on fuel injected in a main injection in at least a partial operating range and which performs stratified combustion by spark ignition using a spark plug on fuel injected prior to the main injection, the control system comprising:
   a controller configured to:
   determine whether or not the diffusion combustion occurs; and
   perform combustion by spark ignition using the spark plug on the fuel injected in the main injection when determining that the diffusion combustion does not occur.

2. The control system of an internal combustion engine according to claim 1, wherein
   the controller is configured to determine that the diffusion combustion does not occur when, after performing spark ignition using the spark plug in order to perform the stratified combustion, a temperature inside a cylinder of the internal combustion engine is equal to or higher than a prescribed temperature and combustion of the fuel injected in the main injection is not detected within a prescribed period from start of the main injection.

3. The control system of an internal combustion engine according to claim 1, wherein
the controller is configured to determine that the diffusion combustion does not occur when, after performing spark ignition using the spark plug in order to perform the stratified combustion, a temperature inside a cylinder of the internal combustion engine is lower than a prescribed temperature, and
the controller is further configured to adjust an amount of the fuel injected in the main injection so that an air-fuel ratio inside the cylinder is lower than a stoichiometric air-fuel ratio, and perform combustion by spark ignition using the spark plug on the fuel injected in the main injection when determining that the diffusion combustion does not occur.

4. The control system of an internal combustion engine according to claim 1, wherein the controller is further configured to halt the main injection midway when a pressure increase rate in a cylinder of the internal combustion engine after start of the main injection equals or exceeds a prescribed rate.

5. The control system of an internal combustion engine according to claim 4, wherein the controller is further configured to restart the main injection after halting the main injection midway.

6. The control system of an internal combustion engine according to claim 1, wherein the controller is configured to perform the stratified combustion a plurality of times until a temperature inside a cylinder of the internal combustion engine equals or exceeds a prescribed temperature before start of the main injection.

* * * * *